: US 11,193,039 B2
(45) Date of Patent: Dec. 7, 2021

(54) STAIN RESISTANT COATING COMPOSITIONS

(71) Applicant: PPG Industries Ohio, Inc., Cleveland, OH (US)

(72) Inventors: Maria Wang, Allison Park, PA (US); Dennis Leroy Faler, North Huntingdon, PA (US); Pedro Velez-Herrera, Pittsburgh, PA (US); Darin Laird, Pittsburgh, PA (US)

(73) Assignee: PPG Industries Ohio, inc., Cleveland, OH (US)

( * ) Notice: Subject to any disclaimer, the term of this patent is extended or adjusted under 35 U.S.C. 154(b) by 211 days.

(21) Appl. No.: 16/035,815

(22) Filed: Jul. 16, 2018

(65) Prior Publication Data

US 2020/0017709 A1 Jan. 16, 2020

(51) Int. Cl.
C09D 175/04 (2006.01)
C09D 7/42 (2018.01)
C09D 5/02 (2006.01)
C09D 133/02 (2006.01)
C08K 3/26 (2006.01)
C08K 3/36 (2006.01)

(52) U.S. Cl.
CPC .......... C09D 175/04 (2013.01); C09D 5/027 (2013.01); C09D 7/42 (2018.01); C09D 133/02 (2013.01); C08K 3/26 (2013.01); C08K 3/36 (2013.01); C08K 2003/265 (2013.01)

(58) Field of Classification Search
CPC .......... C08L 75/16; C09D 7/42; C09D 175/16
See application file for complete search history.

(56) References Cited

U.S. PATENT DOCUMENTS

| | | | |
|---|---|---|---|
| 4,554,018 A * | 11/1985 | Allen | C09D 7/002 260/DIG. 38 |
| 4,844,952 A | 7/1989 | Korenkiewicz et al. | |
| 4,983,662 A | 1/1991 | Overbeek et al. | |
| 5,541,251 A | 7/1996 | Bontinck et al. | |
| 5,571,857 A | 11/1996 | Gruber et al. | |
| 5,574,083 A | 11/1996 | Brown et al. | |
| 5,998,543 A | 12/1999 | Collins et al. | |
| 7,001,952 B2 | 2/2006 | Faler et al. | |
| 7,745,514 B2 | 6/2010 | Cheng et al. | |
| 8,461,256 B2 | 6/2013 | Conner et al. | |
| 8,637,609 B1 * | 1/2014 | Perumal | C08G 18/4238 525/209 |
| 8,912,249 B2 | 12/2014 | Anton et al. | |
| 8,987,350 B2 | 3/2015 | Li et al. | |
| 9,000,069 B1 | 4/2015 | Mackulin et al. | |
| 9,040,621 B2 | 5/2015 | Fenn et al. | |
| 9,873,807 B2 | 1/2018 | Xu et al. | |
| 9,963,613 B2 | 5/2018 | Zhang et al. | |
| 10,066,116 B2 | 9/2018 | Hibben et al. | |
| 10,184,065 B2 | 1/2019 | Dong et al. | |
| 2003/0055171 A1 | 3/2003 | Overbeek et al. | |
| 2003/0087103 A1 | 5/2003 | Belmares et al. | |
| 2004/0214937 A1 | 10/2004 | Miller et al. | |
| 2006/0122330 A1 | 6/2006 | Wu et al. | |
| 2010/0238558 A1 * | 9/2010 | Im | G02F 1/133502 359/599 |
| 2011/0009540 A1 | 1/2011 | Terrenoire et al. | |
| 2011/0009561 A1 * | 1/2011 | Pajerski | C08G 18/0823 524/591 |
| 2013/0035430 A1 * | 2/2013 | Li | C09D 5/028 524/276 |
| 2013/0131268 A1 * | 5/2013 | Buckmann | C09D 151/003 524/850 |
| 2014/0016203 A1 * | 1/2014 | Toshima | G02B 5/0226 359/599 |
| 2014/0128533 A1 * | 5/2014 | Vanmeulder | C08F 2/46 524/507 |
| 2014/0303281 A1 | 10/2014 | Mackulin et al. | |
| 2015/0141568 A1 * | 5/2015 | Yoon | C08L 33/10 524/523 |
| 2016/0115349 A1 * | 4/2016 | Dong | C09D 151/08 524/507 |
| 2016/0347978 A1 | 12/2016 | Thompson et al. | |
| 2016/0355968 A1 | 12/2016 | Song et al. | |
| 2017/0369750 A1 | 12/2017 | Zhao et al. | |

FOREIGN PATENT DOCUMENTS

| | | | | |
|---|---|---|---|---|
| CN | 102134364 A | | 7/2011 | |
| CN | 103958556 A | | 7/2014 | |
| CN | 105669938 A | * | 6/2016 | ............. C08G 18/67 |
| DE | 60217546 T2 | | 10/2007 | |
| EP | 1699839 | | 6/2005 | |
| EP | 2133376 A1 | | 12/2009 | |
| EP | 2557094 | | 2/2013 | |
| JP | 753918 A | | 2/1995 | |
| WO | 03074198 | | 9/2003 | |
| WO | 2008101661 | | 8/2008 | |
| WO | 2009105396 A1 | | 8/2009 | |
| WO | 2016095197 A1 | | 6/2016 | |
| WO | 2016201062 A1 | | 12/2016 | |
| WO | 2017161607 | | 9/2017 | |

OTHER PUBLICATIONS

Machine Translation of CN 105669938 (Year: 2020).*
Deuteron-MK Data Sheet (Year: 2017).*

* cited by examiner

Primary Examiner — Michael M Dollinger
(74) Attorney, Agent, or Firm — Michael J. Grese

(57) ABSTRACT

A coating composition is prepared from an aqueous dispersion of a mixture of (i) urethane acrylate resin particles; (ii) acrylic resin particles; and (iii) a matting agent. A method of imparting stain resistance to a substrate, comprising applying the coating composition to at least a portion of the substrate.

23 Claims, No Drawings

STAIN RESISTANT COATING COMPOSITIONS

FIELD OF THE INVENTION

The present invention relates to stain resistant coating compositions and to low gloss coatings produced therefrom.

BACKGROUND OF THE INVENTION

In aqueous architectural paints as well as other coatings compositions, stain resistance can be achieved by formulating compositions that yield a smooth, glossy surface upon drying. Stain resistance refers to the resistance to stain, difficulty of being wetted by stain, difficulty of being adhered by stain, and/or easiness of stain removal without damage to the coating (i.e. washability). Conventional high-gloss paints or semi-gloss paints are resistant to stains and/or are washable.

SUMMARY OF THE INVENTION

The present invention includes a coating composition comprising an aqueous dispersion of a mixture of urethane acrylate resin particles and acrylic resin particles, wherein the urethane acrylate resin particles and the acrylic resin particles are different from each other; and a matting agent.

DESCRIPTION OF THE INVENTION

For the purposes of the following detailed description, it is to be understood that the invention may assume various alternative variations and step sequences, except where expressly specified to the contrary. It is also to be understood that the specific compositions, coated substrates, multilayer coatings and methods described in the following specification are simply exemplary embodiments of the invention. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As indicated above, certain embodiments of the present invention are directed to aqueous dispersions. As used herein, the term "dispersion" refers to a two-phase system in which one phase includes finely divided particles (e.g. having diameters of less than 500 nm distributed throughout a second phase, which is a continuous phase. The dispersions of the present invention often are an organic phase-in-water" emulsions, wherein an aqueous medium provides the continuous phase of the dispersion in which the particles are suspended as the organic phase.

As used herein, the term "aqueous", "aqueous phase", "aqueous medium", and the like, refers to a medium that either consists exclusively of water or comprises predominantly water (e.g. at least 50 weight percent water) in combination with another material, such as, for example, an inert organic solvent. In certain embodiments, the amount of organic solvent present in the aqueous dispersions of the present invention is less than 20 weight percent, such as less than 10 weight percent, or, in some cases, less than 5 weight percent, or, in yet other cases, less than 2 weight percent, with the weight percents being based on the total weight of the dispersion. Non-limiting examples of suitable organic solvents are propylene glycol monobutyl ether, ethylene glycol monohexyl ether, ethylene glycol monobutyl ether, n-butanol, benzyl alcohol, and mineral spirits.

The term "polymer", which is used interchangeably with "resin" is meant to encompass oligomers, and includes without limitation both homopolymers and copolymers. By "prepolymer" it is meant a polymer produced as an intermediate stage that is further reacted before polymerization is complete.

The coating composition of the present invention with improved stain resistance comprises a mixture of an aqueous dispersion of urethane acrylate resin particles (i) and acrylic resin particles (ii), and a matting agent (iii). By "mixture" it is meant that the components (i), (ii), and (iii) do not react with each other, but instead remain as distinct particles. While not limited thereto, the coating composition of the present invention may be used as an architectural paint, such as an interior paint for coating of surfaces such as interior walls or the like.

The aqueous dispersion includes urethane acrylate resin particles (i), which are produced as an aqueous dispersion of the reaction product obtained by polymerizing a resin reaction mixture including: (A) a carboxy-containing polyurethane prepolymer, that includes a reaction product obtained by reacting a mixture of (a) a polyol; (b) a polymerizable ethylenically unsaturated monomer containing at least one acrylic functional group and at least one active hydrogen group; (c) a polyisocyanate; (d) a chain terminating amine, and (e) a chain extending amine; (B) polymerizable ethylenically unsaturated monomers; and (C) a neutralizing amine. The dispersion of urethane acrylate resin particles may be prepared by forming a carboxy-containing, isocyanate-terminated polyurethane prepolymer, adding polyethylenically unsaturated monomers to the prepolymer to make a prepolymer/monomer mixture, dispersing the prepolymer/monomer mixture in water, along with a neutralizing agent (e.g. a neutralizing amine), a chain terminator and a chain extender, and polymerizing the ethylenically unsaturated monomers.

Suitable polyols (a) in reaction mixture (A) producing the polyurethane prepolymer include those having a number average molecular weight ($M_N$), as determined by gel permeation chromatography using a polystyrene standard in the range of 300-7000, particularly diols and triols and mixtures thereof, but higher functionality polyols may also be used, for example, as minor components in admixture with diols. The polyols may be members of any of the chemical classes of polymeric polyols used in conventional polyurethane formulations. In particular, the polyols may be polyesters, polyesteramides, polyethers, polythioethers, polycarbonates, polyacetals, polyolefins or polysiloxanes.

Polyester polyols which may be used include but are not limited to hydroxyl-terminated reaction products of polyhydric alcohols such as ethylene glycol, propylene glycol, diethylene glycol, neopentyl glycol, 1,4-butanediol, furan dimethanol, cyclohexane dimethanol, glycerol, trimethylolpropane or pentaerythritol, or mixtures thereof, with polycarboxylic acids, especially dicarboxylic acids or their ester-forming derivatives, for example succinic, glutaric and adipic acids or their methyl esters, phthalic anhydride or dimethyl terephthalate. Polyesters obtained by the polymerization of lactones, for example caprolactone, in conjunction with the polyol may also be used.

Polyesteramides may be obtained by the inclusion of amino-alcohols such as ethanolamine in the polyesterification mixtures. Polyether polyols which may be used include products obtained by the polymerization of a cyclic oxide, for example ethylene oxide, propylene oxide or tetrahydrofuran or by the addition of one or more such oxides to polyfunctional initiators, for example water, ethylene glycol, propylene glycol, diethylene glycol, cyclohexane dimethanol, glycerol, trimethylol propane, pentaerythritol or Bisphenol A. Especially useful polyethers include polyoxypropylene diols and triols, poly(oxyethylene-oxypropylene) diols and triols obtained by the simultaneous or sequential addition of ethylene and propylene oxides to appropriate initiators and polytetramethylene ether glycols obtained by the polymerization of tetrahydrofuran.

Polythioether polyols which may be used include products obtained by condensing thiodiglycol, either alone or with other glycols, dicarboxylic acids, formaldehyde, amino-alcohols or amino carboxylic acids.

Polycarbonate polyols which may be used include products obtained by reacting diols such as 1,3-propanediol, 1,4-butanediol, 1,6-hexanediol, diethylene glycol or tetraethylene glycol with diaryl carbonates, for example diphenyl carbonate, or with phosgene.

Polyacetal polyols which may be used include those prepared by reacting glycols such as diethylene glycol, triethylene glycol or hexanediol with formaldehyde. Suitable polyacetals may also be prepared by polymerizing cyclic acetals.

Suitable polyolefin polyols include hydroxy-terminated butadiene homopolymer and copolymers.

The polyols (a) of the reaction mixture (A) may further include monomers containing acid groups such as carboxy group-containing diols and triols which may render the polyurethane prepolymer water dispersible. Suitable carboxy group-containing diols include, for example, dihydroxyalkanoic acids of the formula $R^1C(CH_2OH)_2COOH$ wherein $R^1$ is hydrogen or a $C_1$-$C_{10}$ alkyl group, such as 2,2-dimethylolpropionic acid (DMPA). If desired, the carboxy-containing diol or triol may be incorporated into a polyester by reaction with a dicarboxylic acid before being incorporated into the prepolymer. Useful acid group containing compounds include aminocarboxylic acids, for example lysine, cystine and 3,5-diaminobenzoic acid.

Polymerizable ethylenically unsaturated monomers (b) containing at least one acrylic functional group and at least one active hydrogen group included in the reaction mixture (A) include ethylenically unsaturated groups such as acrylates, methacrylates. The acrylate and methacrylate functional groups may be represented by the formula, $CH_2$=C($R^2$)—C(O)O—, wherein $R^2$ is hydrogen or methyl. Other monomers included in component (b) may include allyl carbamates and allyl carbonates. The allyl carbamates and carbonates may be represented by the formulae $CH_2$=CH—$CH_2$—NH—C(O)O— and $CH_2$=CH—$CH_2$—O—(C)O—, respectively. For example, the ethylenically unsaturated monomer with an acrylic functional group and an active hydrogen group utilized in preparing the polyurethane prepolymers may comprise a hydroxyalkyl (meth)acrylate. Suitable hydroxyalkyl(meth)acrylates include those having from 1 to 18 carbon atoms in the alkyl radical, the alkyl radical being substituted or unsubstituted. Specific non-limiting examples of such materials include 2-hydroxyethyl (meth)acrylate (HEMA), 2-hydroxypropyl(meth)acrylate, 2-hydroxybutyl(meth)acrylate, hexane-1,6-diol mono(meth)acrylate, 4-hydroxybutyl(meth)acrylate, as well as mixtures thereof. As used herein, the term "(meth)acrylate" is meant to include both acrylates and methacrylates.

The polyisocyanate (c) used in the reaction mixture (A) to produce the polyurethane prepolymer may be aliphatic or aromatic or a mixture thereof. Diisocyanates may be used, although higher polyisocyanates such as isocyanurates of diisocyanates may be used, such as diphenylmethane diisocyanate (MDI), including its 2,4', 2,2' and 4,4' isomers, homopolymers and mixtures thereof, mixtures of diphenylmethane diisocyanates (MDI) and oligomers thereof, and reaction products of polyisocyanates as set out herein with components containing isocyanate-reactive hydrogen atoms forming polymeric polyisocyanates (prepolymers), toluene diisocyanate (TDI), including 2,4 TDI and 2,6 TDI in any suitable isomer mixture thereof, hexamethylene diisocyanate (HMDI or HDI), isophorone diisocyanate (IPDI), butylene diisocyanate, trimethylhexamethylene diisocyanate, di(isocyanatocyclohexyl)methane, including 4,4'-diisocyanatodicyclohexylmethane (H12MDI), isocyanatomethyl-1,8-octane diisocyanate, tetramethylxylene diisocyanate (TMXDI), 1,5-naphtalenediisocyanate (NDI), p-phenylenediisocyanate (PPDI), 1,4-cyclohexanediisocyanate (CD), tolidine diisocyanate (TODI, any suitable mixture of these polyisocyanates, and any suitable mixture of one or more of these polyisocyanates with MDI-type polyisocyanates.

Suitable chain terminating amines (d) include $C_1$-$C_6$ alkyl amines such as butylamine, diethylamine, diisopropylamine, and dibutylamine, and $C_1$-$C_6$ hydroxyamines such as ethanolamine, diethanolamine, and diisopropanolamine. Suitable chain extending amines (e) may include ethylenediamine, diethylene triamine, triethylene tetramine, propylene diamine, butylene diamine, hexamethylene diamine, cyclohexylene diamine, piperazine, 2-methyl piperazine, phenylene diamine, toluene diamine, tris(2-aminoethyl)amine, 4,4'-methylenebis(2-chloraniline), 3,3'-dichloro-4,4'-diphenyl diamine, 2,6-diaminopyridine, 4,4'-diaminodiphenyl methane, isophorone diamine, and adducts of diethylenetriamine with acrylate or its hydrolyzed products, especially $C_2$-$C_{10}$ alkylamines such as dimethyl ethylene diamine (DMEA). The amount of chain extender employed should be approximately equivalent to the free isocyanate groups in the prepolymer and the ratio of active hydrogens in the chain extender to isocyanate groups in the prepolymer may be in the range from 0.7 to 1.3:1.

The water-dispersible polyurethane prepolymer may be prepared in conventional manner by reacting a stoichiometric excess of the polyisocyanate with the polyols under substantially anhydrous conditions at a temperature between 30° and 130° C. until the reaction between the isocyanate groups and the active hydrogen (hydroxyl) group is substantially complete. A polyisocyanate and the active hydrogen containing components are suitably reacted in such proportions that the ratio of number of isocyanate groups to the number of active hydrogen groups is in the range from 1.1:1 to 6:1, such as within the range of from 1.5:1 to 3:1.

Suitable adjuvants and/or additives may be included in the reaction mixture (A) such as free radical polymerization inhibitors and/or antioxidants (anti-yellowing additives) such as 3-methyl-2-butenol, organo pyrocarbonates and triphenyl phosphite.

Suitable polymerizable ethylenically unsaturated monomers (B) included in the resin reaction mixture include ethylenically unsaturated hydrocarbons, esters and ethers, such as esters of acrylic and methacrylic acids, and esters of vinyl alcohol and styrene. Specific examples include butadiene, isoprene, styrene, substituted styrenes, the lower alkyl ($C_1$-$C_6$) esters of acrylic, methacrylic and maleic acids such as butyl methacrylate (BMA), vinyl acetate and butyrate, acrylonitrile, vinylmethyl, propyl and butyl ethers, vinyl chloride, vinylidene chloride, and the like. Other suitable polyethylenically unsaturated monomers include allylmethacrylate, diacrylate esters of $C_1$-$C_6$ diols such as butanediol diacrylate and hexanediol diacrylate, divinyl benzene, divinyl ether, divinyl sulfide, trimethylolpropane triacrylate and the like.

A neutralizing amine (C) is included to neutralize the acid functionality of the carboxy groups and is added to the resin reaction to render the reaction product water dispersible, i.e., an amount to substantially neutralize the carboxylic functionality as is well known in the art. Suitably, the amine is added at 65 to 100% amine equivalent per equivalent of carboxy functionality. Tertiary amines that may be used in the practice of the invention are relatively volatile so that they evaporate from the coating upon curing. Examples would include amines of the formula $N(R^3)(R^4)(R^5)$ where $R^3$, $R^4$, and $R^5$ are independently $C_1$-$C_4$ alkyl and hydroxyalkyl groups. Illustrative of such tertiary amines are triethyl amine, dimethylethanol amine, methyldiethanol amine, and methyldiethyl amine. The prepolymer/monomer mixture may be dispersed in water using techniques well known in the art. The mixture may be added to the water with agitation, or, alternatively, water may be stirred into the mixture.

The resin reaction mixture is subjected to free radical initiated polymerization by adding thereto free radical initiators. Suitable free radical initiators include what are known as redox initiators, which are composed of at least one organic reducing agent and at least one peroxide and/or hydroperoxide, e.g. tert-butyl hydroperoxide with sulfur compounds, e.g. the sodium salt of hydroxymethanesulfinic acid, sodium sulfite, sodium disulfite, sodium thiosulfate or acetone bisulfite adduct, or hydrogen peroxide with ascorbic acid. Alternatively, free radical polymerization of the resin reaction mixture may be conducted with addition of polymerization initiators at an elevated temperature, namely a temperature sufficient to liberate free radicals at a rate that sustains the polymerization reaction and to complete chain extension of the prepolymer since the chain extending reaction begins to proceed upon the addition of the chain extender to the aqueous dispersion. A suitable temperature range is 50° to 90° C. Suitable thermal free radical initiators include, but are not limited to, peroxide compounds, azo compounds, persulfate compounds, and mixtures thereof.

It should be appreciated that the order of addition of the ethylenically unsaturated monomers (B) and amine component (C) may be varied. An initiator composition may be added to the resin reaction mixture in one or more stages to effect and continue polymerization.

The aqueous dispersion of acrylic resin particles (ii) includes the reaction product of ethylenically unsaturated monomers, which may include polyethylenically unsaturated monomers.

Suitable ethylenically unsaturated monomers with only one site of unsaturation, i.e., mono-ethylenically unsaturated monomers include, but are not limited to, styrene, .alpha.-methylstyrene, vinyl toluene, 4-methylstyrene, tert-butylstyrene, 2-chlorostyrene, vinylpyridine, vinylpyrrolidone, methyl crotonoate, sodium crotonoate, ethyl acrylate, propyl acrylate, isopropyl acrylate, butyl acrylate, 2-ethylhexyl acrylate, decyl acrylate, hydroxyethyl acrylate, methyl methacrylate, ethyl methacrylate, propyl methacrylate, isopropyl methacrylate, butyl methacrylate, sec-butyl methacrylate, isobutyl methacrylate, n-amyl methacrylate, isoamyl methacrylate, n-hexyl methacrylate, tert-butyl methacrylate, 2-ethylhexyl methacrylate, n-octyl methacrylate, methallyl methacrylate, phenyl methacrylate, benzyl methacrylate, allyl methacrylate, cyclohexyl methacrylate, 2-hydroxyethyl methacrylate, 2-hydroxypropyl methacrylate, N,N-dimethylaminoethyl methacrylate, N,N-diethylamino ethyl methacrylate, tert-butylamino ethyl methacrylate, 2-sulfoethyl methacrylate, trifluoroethyl methacrylate, glycidyl methacrylate, 2-n-butoxyethyl methacrylate, 2-chloroethyl methacrylate, 2-ethylbutyl methacrylate, cinnamyl methacrylate, cyclopentyl methacrylate, 2-ethoxyethyl methacrylate, furfuryl methacrylate, hexafluoroisopropyl methacrylate, 3-methoxybutyl methacrylate, 2-methoxybutyl methacrylate, 2-nitro-2-methylpropyl methacrylate, 2-phenoxyethyl methacrylate, 2-phenylethyl methacrylate, propargyl methacrylate, tetrahydrofurfuryl methacrylate, tetrahydropyranyl methacrylate, methacrylamide, N-methylmethacrylamide, N-ethylmethacrylamide, N,N-diethylmethacrylamide, N,N-dimethylmethacrylamide, N-phenylmethacrylamide, acrylamide, N,N-diethylacrylamide, N-ethylacrylamide, methyl 2-cyanoacrylate, methyl α-chloroacrylate, methacrolein, acrolein, methacrylonitrile, and acrylonitrile.

Specific non-limiting examples of polyethylenically unsaturated monomers that can be used in the acrylic resin particles (ii) include, but are not limited to, diacrylates, such as 1,6-hexanediol diacrylate, 1,4-butanediol diacrylate, ethylene glycol diacrylate, diethylene glycol diacrylate, tetraethylene glycol diacrylate, tripropylene glycol diacrylate, neopentyl glycol diacrylate, 1,4-butanediol dimethacrylate, poly(butanediol) diacrylate, tetraethylene glycol dimethacrylate, 1,3-butylene glycol diacrylate, triethylene glycol diacrylate, triisopropylene glycol diacrylate, polyethylene glycol diacrylate, and/or bisphenol A dimethacrylate; triacrylates, such as trimethylolpropane triacrylate, trimethylolpropane trimethacrylate, pentaerythritol monohydroxy triacrylate, and/or trimethylolpropane triethoxy triacrylate; tetraacrylates, such as pentaerythritol tetraacrylate, and/or di-trimethylolpropane tetraacrylate; and/or pentaacrylates, such as dipentaerythritol (monohydroxy) pentaacrylate.

Acrylic polymers can be prepared via aqueous emulsion polymerization techniques or via organic solution polymerization techniques with groups capable of salt formation such as acid or amine groups. Upon neutralization of these groups with a base or acid, the polymers can be dispersed into an aqueous medium.

The matting agent (iii) of the present invention includes inorganic and/or organic matting agents. Suitable inorganic matting agents include silica, alumina silicate and/or calcium carbonate, with particle size less than 100 microns, such as below 10 microns. Suitable organic matting agents include a wax, a thermoplastic polymer and/or a thermoset polymer, wherein the organic matting agent is different from the urethane acrylate resin particles (i) and the acrylic resin particles (ii). The matting agents should be able to confer low gloss to the coating, where low gloss is defined as Master Painters Institute (MPI) Gloss Levels 1 through 3 (matte finish, velvet-like finish, and eggshell finish, respectively) with a 60° gloss below 20 units and a 85° sheen below 35 units.

It has been found that improved stain resistance can be achieved when the z-average particle size of the urethane acrylate resin particles is smaller than the z-average particle size of the acrylic particles. In contrast, improved stain resistance is not achieved when the z-average particle size of the acrylic resin particles is less than the urethane acrylate resin particles. The z-average particle size can be measured using dynamic light scattering techniques and instruments well known in the art. Samples are diluted and dispersed in an appropriate solvent for light scattering. The measurement instrument, such as a Malvern Zetasizer Nano ZS, evaluates the changes in the light intensity pattern for the sample, and calculates an average particle diameter and distribution. For example, the acrylic resin particles may be a z-average particle size that is greater than the urethane acrylate resin particles by at least 10%, such as at least 20% or 30% or 40% or 50% or 60%. For example, the acrylic resin particle size may range from 120 nm to 150 nm and the urethane acrylate resin particle size may range from 55 nm to 140 nm. Not intending to be limited to any particular theory, in one aspect, the smaller urethane acrylate resin particles may fill in the gaps between the larger acrylic resin particles, thereby forming a closely packed paint film that is more resistance to stain penetration. Furthermore, the smaller urethane acrylate particles might self-stratify to the surface of the paint film, thereby forming resin-rich domains on the surface that are resistant to stain penetration. The z-average particle sizes of each of the urethane acrylic particles and the acrylic resin particles may be selected via polymerization conditions and/or monomer component concentrations as is well known in the art. For example, the z-average particle size of the urethane acrylate particles may be adjusted by varying the relative amount of tertiary amine included in the amine component (c). In particular, a higher amount of neutralizing amine results in smaller urethane acrylate particles. A water dispersible polyurethane polymer contains both water-compatible segments and water-incompatible segments. While not being limited to any particular theory, it is believed that when a water dispersible polyurethane polymer is added to water, the polymer chains arrange themselves to form microparticles in which the water-compatible segments are on the surface of the microparticles and the water-incompatible segments are on the interior of the microparticles. A polymer that has relatively more water-compatible segments and relatively less water-incompatible segments will form microparticles with relatively higher surface area and relatively lower interior volume resulting in smaller sized microparticles. A greater amount of acid in the polyurethane polymer and a greater amount of neutralizing amine results in more water-compatible polymer segments and less water-incompatible polymer segments resulting in smaller microparticles. Between 50% and 100% of the acid in the polyurethane polymer can be neutralized with a neutralizing amine (C) prior to finalizing the microparticle structure by polymerizing the polymerizable ethylenically unsaturated monomers (B).

The urethane acrylate resin particles may comprise 30 wt. % to 90 wt. %, such as 50 wt. % to 80 wt. %, polyurethane prepolymer (A), and 10 wt. % to 70 wt. %, such as 20 wt. % to 50 wt. %, polymer formed from polymerizable ethylenically unsaturated monomers (B).

Polyurethane prepolymer (A) may comprise 30 wt. % to 90 wt. %, such as 40 wt. % to 60 wt. % of a polyol (a); 0.3 wt. % to 8 wt. %, such as 0.5 wt. % to 3 wt. % of a polymerizable ethylenically unsaturated monomer containing at least one hydroxyl group (b); 20% to 60 wt. %, such as 30 wt. % to 50 wt. % of a polyisocyanate (c); 0.2 wt. % to 6 wt. %, such as 0.4 wt. % to 3 wt. % of a chain terminating amine (d); 0.5 wt. % to 6 wt. %, such as 2 wt. % to 4 wt. % of a chain extending amine (e). The polyurethane pre-polymer (a) can have a number average molecular weight ($M_N$, as determined by gel permeation chromatography) in the range of 1800-25000, such as 5000 to 10000, and can have an acid equivalent weight of 800 to 3000, such as 1000 to 2000 (as determined by titration with a standardized base solution).

Likewise, the z-particle size of the acrylic resin particles may be adjusted by varying the surfactant type and/or concentration and/or using a seed latex. The surfactant type and concentration can determine the number and size of the micelles that form during emulsion polymerization, which in turn, determine the particle size of the resultant acrylic latex. Surfactants stabilize the polymer particles during nucleation and growth inside the micelles. To better control the particle size and produce a narrower particle size distribution, a seed latex can be used as a nucleation point for polymerization. The number of particles stays constant as monomer and surfactant are added to grow the latex particles.

The coating composition of the present invention may be prepared by mixing together in any order the aqueous dispersion of urethane acrylate resin particles, the aqueous dispersion of acrylic resin particles and the matting agent. The matting agent may be incorporated into the aqueous dispersion of acrylic resin particles during preparation thereof, such as during a grinding stage. The coating composition of the present invention may include at least 5 wt. % and up to 50 wt. % including all amounts therebetween of the urethane acrylate resin based on total resin solids. For example, the urethane acrylate resin may comprise 10-35 wt. %, including all amounts therebetween, of the total resin solids in the coating composition. The coating composition of the present invention may include at least 50 wt. % and up to 95 wt. % including all amounts therebetween of the acrylic based on total resin solids. For example, the acrylic may comprise 65-90 wt. % including all amounts therebetween of the total resin solids in the coating composition. The matting agent may be present in the coating composition in an amount of 5-50 wt. % (including all amounts therebetween) based on total solids, with the balance of solids attributed to other components of the formulation such as pigments, resins, rheology modifiers, wetting agents, defoamers, coalescents and biocides.

The coating composition of the present invention may be formulated to include a variety of optional ingredients and/or additives, in addition to the above-described antioxidants, catalysts and initiators, such as biocides, biostats, reinforcements, thixotropes, accelerators, surfactants, coalescing agents, plasticizers, extenders, stabilizers, corrosion inhibitors, diluents, hindered amine light stabilizers, and UV light absorbers. Depending on the volatile organic compounds (VOC) of such additional components, (particularly coalescing agents and/or plasticizers), the coating composition of the present invention may contain little or no VOC, such as below 50 g/L or below 25 g/L or below 5 g/L or none.

The present invention is also directed to a method of coating a substrate with the stain resistant coating composition described herein. The method includes applying the coating composition over at least a portion of a substrate. The coating composition can be applied in liquid form and dried, such as at ambient temperature conditions in the range of −10° C. to 50° C.

Formulation of the coating composition involves the process of selecting and admixing appropriate coating ingredients in the correct proportions to provide a paint with specific processing and handling properties, as well as a final dry paint film with the desired properties. The aqueous coating composition may be applied by conventional application methods such as, for example, brushing, roller application, and spraying methods such as, for example, air-atomized spray, air-assisted spray, airless spray, high volume low pressure spray, and air-assisted airless spray. Suitable substrates include, but are not limited to, for example, concrete, cement board, MDF (medium density fiberboard) and particle board, gypsum board, wood, stone, metal, plastics, wall paper and textile, etc. which may be pre-primed by waterborne or solvent borne primers. When applied to a substrate and dried to form a coating thereon, it has been found that the dried coating containing both urethane acrylate resin and acrylic resin along with the matting agent imparts stain resistance at low gloss levels. Stain resistance may be determined as described in the Examples below.

Illustrating the invention are the following examples that are not to be considered as limiting the invention to their details. All parts and percentages in the examples, as well as throughout the specification, are by weight unless otherwise indicated.

EXAMPLES

The following Base Formulation and test methods were used in the Examples.

I. Base Formulation

Coating compositions were prepared according to the Base Formulation in Table 1 (no VOC) with different resin blends, keeping the total resin solids constant by weight. The grind ingredients were mixed using a high-speed Cowles disperser at sufficient speed to create a vortex where the blade meets the paint. After addition of the matting agent, the grind process resumed for 20 minutes, followed by adding the letdown ingredients using a conventional lab mixer and mixing for 30 minutes after the last addition.

TABLE 1

| Base Formulation. | |
|---|---|
| Item | Amount (g) |
| Grind | |
| Water | 100.0 |
| PANGEL S9[1] | 3.0 |
| TYLOSE ® HX 6000[2] YG4 | 2.0 |

TABLE 1-continued

| Base Formulation. | |
|---|---|
| Item | Amount (g) |
| DREWPLUS ™ T-4507[3] | 2.0 |
| TAMOL ™ 731A[4] | 5.0 |
| ZETASPERSE ® 179[5] | 6.0 |
| MINEX ® 4[6] | 92.0 |
| Letdown | |
| Water | 71.0 |
| ACRYSOL ™ RM-2020 NPR[7] | 17.0 |
| TRONOX ® CR-826S[8] | 387.0 |
| DREWPLUS ™ T-4507[3] | 8.0 |
| Resin blend | 430.0 |
| OPTIFILM ™ enhancer 400[9] | 15.0 |
| ACTICIDE ® MBS[10] | 1.2 |

[1]Magnesium silicate rheology modifier, available from The Carey Company, Addison, IL.
[2]Hydroxyethylcellulose rheology modifier, available from SETylose USA, Plaquemine, LA.
[3]Mineral oil defoamer, available from Ashland, Columbus, OH.
[4]Dispersant available from The Dow Chemical Company, Midland, MI.
[5]Nonionic surfactant, available from Evonik Industries AG, Essen, Germany.
[6]Aluminum silicate matting agent, available from The Cary Company, Addison, IL.
[7]Hydrophobically modified ethylene oxide urethane rheology modifier, available from The Dow Chemical Company.
[8]Rutile titanium dioxide slurry, available from Tronox Limited, Stamford, CT.
[9]Coalescent (no VOC), available from The Eastman Chemical Company, Kingsport, TN.
[10]Biocide, available from Thor Specialties, Inc., Shelton, CT.

II. Stain Resistance Test Method

The stain resistance test method is a more challenging, modified version of ASTM D4828 to target stain removal using fewer scrub cycles. Films were prepared by drawing down the Base Formulation onto black Leneta scrub panels (Form P121-10N) using a 7-mil horseshoe drawdown bar. The films were dried at ambient conditions for 7 days before stain application. The following stains were applied to the paint films via one-inch strips of filter paper saturated with the following fluids: red wine, grape juice, java concentrate, and hot coffee (70° C.). The following stains were directly applied to the paint films: mustard, red lipstick, green crayon, graphite powder, and Leneta staining medium ST-1. After 30 minutes, the lipstick and Leneta medium were wiped off, and the paint films were rinsed and placed in a washability machine (Gardner Abrasion Tester). A damp cellulosic sponge containing 10 g of water and 6 g of SOFT SCRUB® (cleanser, Henkel Corporation) was placed in a 1000 g holder, and the panels were scrubbed for 6 cycles. After rinsing the panels and drying for at least 2 hours, each of the 9 stains was rated on an integer scale of 0 for no stain removal to 10 for complete stain removal.

III. Gloss Test Method

Low gloss is defined herein as Master Painters Institute (MPI) Gloss Levels 1 through 3 (matte finish, velvet-like finish, and eggshell finish, respectively) with a 60° gloss below 20 units and an 85° sheen below 35 units. The gloss was measured using a micro-TRI-gloss meter from BYK Gardner according to ASTM D523.

Examples 1-11: Polyurethane Acrylate (PUA) Synthesis

Example 1 (PUA1)

A polyurethane acrylate resin was prepared in a four-neck round bottom flask equipped with an electronic temperature probe, mechanical stirrer, condenser, and a heating mantle. The following components were used:

TABLE 2

| Component | Mass (g) |
|---|---|
| Charge A | |
| FOMREZ 55-112[11], molecular weight 1000 | 306.6 g |
| Dimethylolpropionic acid (DMPA) | 123.4 g |
| Hydroxyethyl methacrylate (HEMA) | 65.9 g |
| Triethylamine (TEA) | 37.3 g |
| Triphenyl phosphite (TPP) | 1.0 g |
| Butylated hydroxytoluene (IONOL[12]) | 1.0 g |
| Charge B | |
| Butyl methacrylate (BMA) | 310.4 g |
| Charge C | |
| Isophorone diisocyanate (IPDI) | 449.9 g |
| Charge D | |
| Butyl methacrylate (BMA) | 61.3 g |
| Charge E | |
| Water | 1686.0 g |
| Dimethylethanolamine (DMEA) | 15.7 g |
| Ethylenediamine (EDA) | 7.4 g |
| Diethanolamine (DEA) | 42.5 g |
| Charge F | |
| Butyl methacrylate (BMA) | 49.0 g |
| Charge G | |
| Water | 1012.2 g |
| Charge H | |
| Water | 40.0 g |
| Ferrous ammonium sulfate | 0.02 g |
| t-Butyl hydroperoxide (70%) | 1.2 g |
| Charge I | |
| Water | 120.0 g |
| Sodium metabisulfite | 1.2 g |
| Charge J | |
| PROXEL GXL[13] | 2.4 g |

[11]Polyester polyol, available from Chemtura Corporation Middlebury, CT.
[12]Antioxident/free radical scavenger, available from Oxiris, Barcelona, Spain.
[13]Biostat, available from Lonza, Allendale, NJ.

Charge A was stirred in the flask at 90° C. for thirty minutes. Charge B was added and the mixture was adjusted to 50° C. Charge C was added over 20 minutes. Charge D was used to rinse the addition funnel used for Charge C. The reaction mixture was held at 90° C. for three hours.

Charge E was heated in a separate four-neck flask under a nitrogen atmosphere to 85° C. 1085 g of the reaction product of charges A, B, C, and D was added to charge E over a 15 minute period. The mixture was cooled to 28° C. and a nitrogen atmosphere was established and maintained in the flask for the remainder of the reaction. Charges F, G, and H were added to the reaction flask followed by a thirty minute addition of Charge I. The temperature rose exothermically to 39° C. Brookfield viscosities were measured at 25° C. on a Brookfield Viscometer DV-II+Pro using spindle #2 at 60 RPM. Non-volatile contents were measured by comparing initial sample weights to sample weights after exposure to 110° C. for 1 hour. The final dispersion had a Brookfield viscosity of 170 centipoise, a pH of 7.61, and a nonvolatile content of 28.9%. The monomer content on a solids basis is reported in Table 3.

Examples 2-11 (PUA2-PUA11)

Example 1 was repeated in Examples 2-11 using the monomer contents reported in Table 3 using either a polyester polyol (FOMREZ 55-112) or polyether polyol (POLYTHF 1000). The initiators in charges H and I were added at the same relative amount to monomers as in Example 1. In Examples 2-7 and 11, the EDA and DEA in Charge E of Example 1 was replaced with adipic dihydrazide (ADH). The percentages of the components of the polyurethane and acrylic polymers are reported as weight percentages of the total solid polyurethane acrylate polymer. The percentages of the neutralizing amines TEA and DMEA are reported as weight percentages of the dispersion of final polyurethane acrylate resin in water. The polyurethane acrylate resins with the compositions in Table 3 were used to prepare Base Formulations that were blended at 10% to 33% of total resin solids with a Base Acrylic latex, RHOPLEX™ SG-30, in all Examples as described below.

TABLE 3

Polyurethane acrylate compositions (PUA1-PUA11).

| | | Polyurethane (PU) composition | | | | | | (Meth)acrylate composition | | | | Final resin | | |
|---|---|---|---|---|---|---|---|---|---|---|---|---|---|---|
| EX. | PUA | Polyol wt. % | DMPA wt. % | HEMA wt. % | IPDI wt. % | EDA wt. % | DEA wt. % | ADH wt. % | BA wt. % | MMA wt. % | EGDMA wt. % | BMA wt. % | TEA wt. % | DMEA wt. % | % solids |
| 1 | PUA1 | FOMREZ 55-112 21.3 | 9.1 | 4.4 | 31.1 | 0.6 | 3.6 | 0 | 0 | 0 | 0 | 30.0 | 0.79 | 0.37 | 28.9 |
| 2 | PUA2 | POLYTHF[14] 1000 31.5 | 4.8 | 0.7 | 19.1 | 0 | 0 | 4.0 | 17.0 | 17.0 | 6.0 | 0 | 0.44 | 0.42 | 37.5 |
| 3 | PUA3 | FOMREZ 55-112 33.9 | 3.6 | 0.7 | 17.8 | 0 | 0 | 4.1 | 17.0 | 17.0 | 6.0 | 0 | 0.33 | 0.41 | 37.2 |
| 4 | PUA4 | POLYTHF 1000 21.0 | 3.2 | 0.4 | 12.8 | 0 | 0 | 2.6 | 27.0 | 27.0 | 6.0 | 0 | 0.29 | 0.29 | 37.6 |
| 5 | PUA5 | FOMREZ 55-112 22.6 | 2.4 | 0.4 | 11.9 | 0 | 0 | 2.7 | 27.0 | 27.0 | 6.0 | 0 | 0.22 | 0.28 | 37.5 |
| 6 | PUA6 | FOMREZ 55-112 22.6 | 2.4 | 0.4 | 11.9 | 0 | 0 | 2.7 | 6.0 | 27.0 | 20.3 | 6.7 | 0.22 | 0.28 | 37.9 |
| 7 | PUA7 | FOMREZ 55-112 22.6 | 2.4 | 0.4 | 11.9 | 0 | 0 | 2.7 | 6.7 | 47.2 | 6.0 | 0 | 0.22 | 0.28 | 37.9 |
| 8 | PUA8 | POLYTHF 1000 35.2 | 5.6 | 1.5 | 25.2 | 1.3 | 1.2 | 0 | 0 | 0 | 0 | 30.0 | 0.42 | 0.40 | 31.6 |
| 9 | PUA9 | POLYTHF 1000 35.2 | 5.6 | 1.5 | 25.2 | 1.3 | 1.2 | 0 | 0 | 0 | 0 | 30.0 | 0.47 | 0.19 | 35.6 |

TABLE 3-continued

Polyurethane acrylate compositions (PUA1-PUA11).

| | | Polyurethane (PU) composition | | | | | | (Meth)acrylate composition | | | Final resin | | |
|---|---|---|---|---|---|---|---|---|---|---|---|---|---|---|
| EX. | PUA | Polyol wt. % | DMPA wt. % | HEMA wt. % | IPDI wt. % | EDA wt. % | DEA wt. % | ADH wt. % | BA wt. % | MMA wt. % | EGDMA wt. % | BMA wt. % | TEA wt. % | DMEA wt. % | % solids |
| 10 | PUA10 | POLYTHF 1000 35.2 | 5.6 | 1.5 | 25.2 | 1.3 | 1.2 | 0 | 0 | 0 | 0 | 30.0 | 0.48 | 0.02 | 36.5 |
| 11 | PUA11 | POLYTHF 1000 35.7 | 5.6 | 1.5 | 22.7 | 0 | 0 | 4.5 | 0 | 0 | 0 | 30.0 | 0.51 | 0.56 | 38.1 |

[14]Polyether polyol, available from BASF Corporation, Florham Park, NJ

Examples 12-16

In Examples 12-16, reported in Table 4, Base Formulations were prepared using a control resin (the Base Acrylic latex only, Comparative Example 12) and blends of PUA1 with Base Acrylic (Examples 13 and 14). The matting agent was excluded from Comparative Examples 15 and 16. The gloss levels of the Base Formulation containing PUA/Base Acrylic blend (Examples 13 and 14) were comparable to the 100% Base Acrylic control (Comparative Example 12) when a matting agent was present.

TABLE 4

Base Formulations with and without matting agent.

| Example | Resin Blend in Base Formulation | Matting Agent | Gloss Units 60° | Gloss Units 85° |
|---|---|---|---|---|
| CE. 12 | 100% Base Acrylic | yes | 11.0 | 20.6 |
| Ex. 13 | 20% PUA 1/80% Base Acrylic | yes | 10.6 | 21.8 |
| Ex. 14 | 30% PUA 1/70% Base Acrylic | yes | 10.2 | 21.5 |
| CE. 15 | 20% PUA 1/80% Base Acrylic | no | 25.1 | 67.6 |
| CE. 16 | 30% PUA 1/70% Base Acrylic | no | 26.0 | 77.0 |

Examples 17-23

In Examples 17-23, reported in Table 5, Base Formulations were prepared using a control resin (the Base Acrylic latex only, Comparative Example 17) and blends of 33% PUA and 67% Base Acrylic using the polyurethane acrylate resins of Examples 2-7 (PUA2-PUA7) in Examples 18-23. Up to 51% improvement in stain resistance was achieved in the Base Formulations including resin blends containing PUA18-PUA23 (Examples 18-23) as compared to the Base Formulation including only the Base Acrylic control resin (Comparative Example 17).

TABLE 5

Formulations containing 33% PUA/67% base acrylic blends.

| Stain | CE. 17 control | Ex. 18 PUA 2 | Ex. 19 PUA 3 | Ex. 20 PUA 4 | Ex. 21 PUA 5 | Ex. 22 PUA 6 | Ex. 23 PUA 7 |
|---|---|---|---|---|---|---|---|
| Wine | 2 | 7 | 6 | 4 | 5 | 5 | 5 |
| Grape Juice | 6 | 8 | 8 | 7 | 7 | 7 | 7 |
| Java Concentrate | 5 | 6 | 8 | 5 | 6 | 5 | 5 |
| Hot Coffee | 4 | 6 | 5 | 4 | 4 | 4 | 5 |
| Mustard | 2 | 3 | 2 | 3 | 3 | 3 | 4 |
| Lipstick | 3 | 7 | 5 | 3 | 6 | 7 | 6 |
| Green Crayon | 8 | 7 | 7 | 9 | 8 | 8 | 8 |
| Graphite | 5 | 8 | 5 | 6 | 6 | 6 | 6 |
| Leneta Oil | 4 | 7 | 6 | 5 | 5 | 6 | 4 |
| Total | 39 | 59 | 52 | 46 | 50 | 51 | 50 |
| % Improvement | 0% | 51% | 33% | 18% | 28% | 31% | 28% |

Examples 24-26

In Examples 24-26, reported in Table 6, Base Formulations were prepared using the polyurethane acrylate resin of Example 2 (PUA2) at different blend ratios with the Base Acrylic latex. The stain resistance increased as the amount of PUA increased from 10% to 30% of the resin blend solids in the Base Formulation.

TABLE 6

Ladder blend of PUA.

| Stain | Ex. 24 10% PUA 2/ 90% Base Acrylic | Ex. 25 20% PUA 2/ 80% Base Acrylic | Ex. 26 30% PUA 2/ 70% Base Acrylic |
|---|---|---|---|
| Wine | 4 | 6 | 7 |
| Grape Juice | 7 | 8 | 8 |
| Java Concentrate | 6 | 6 | 8 |
| Hot Coffee | 4 | 5 | 5 |
| Mustard | 2 | 3 | 3 |
| Lipstick | 5 | 6 | 7 |
| Green Crayon | 9 | 10 | 9 |
| Graphite | 8 | 8 | 8 |
| Leneta Oil | 6 | 6 | 6 |
| Total | 51 | 58 | 61 |

Examples 27-30

In Examples 27-30, reported in Table 7, Base Formulations were prepared using the polyurethane acrylate resins of Examples 8-11 (PUA8-PUA11) at a ratio of 30% PUA/70% Base Acrylic latex. The particle sizes of PUA 8-11 reported in Table 6 were achieved by varying the amount of neutralizing tertiary amine (DMEA) as shown in Table 3. The z-average particle size was measured using a Zetasizer from Malvern Instruments. Stain resistance improved with reduced particle size PUA resin particles (Examples 27-29) that are smaller than that of the Base Acrylic shown in Comparative Example 31. When the PUA resin particle is larger than the Base Acrylic, there is no improvement in stain resistance (Comparative Example 30).

TABLE 7

Various PUA particle sizes.

| Stain | Ex. 27 PUA 8 | Ex. 28 PUA 9 | Ex. 29 PUA 10 | CE. 30 PUA 11 |
|---|---|---|---|---|
| Particle size (nm) | 55 | 89 | 136 | 173 |
| Wine | 6 | 5 | 5 | 5 |
| Grape Juice | 8 | 7 | 8 | 6 |
| Java Concentrate | 7 | 5 | 5 | 4 |
| Hot Coffee | 4 | 3 | 2 | 3 |
| Mustard | 3 | 4 | 3 | 2 |
| Lipstick | 6 | 6 | 5 | 6 |
| Green Crayon | 7 | 6 | 6 | 3 |
| Graphite | 8 | 8 | 5 | 5 |
| Leneta Oil | 8 | 7 | 6 | 6 |
| Total | 57 | 51 | 45 | 40 |

Comparative Examples 31-35

In Comparative Examples 31-35, reported in Table 8, Base Formulations were prepared using the control (the Base Acrylic latex only, Comparative Example 31) and blends of 30% Comparative Acrylics A-D with 70% Base Acrylic. The Comparative Acrylics were synthesized using emulsion polymerization methods well known in the art, and are similar in composition to the Base Acrylic. Negligible improvement in stain resistance was observed with 30% Comparative Acrylic/70% Base Acrylic blends in the Base Formulation at various particle sizes of the Comparative Acrylic resins. This suggests that some degree of resin incompatibility in blending PUA with the Base Acrylic is causing the particle size effect on improved stain resistance.

TABLE 8

Comparative acrylic resin blends.

| | CE. 31 control | CE. 32 A | CE. 33 B | CE. 34 C | CE. 35 D |
|---|---|---|---|---|---|
| Particle size (nm) | 150 | 85 | 113 | 193 | 360 |
| Wine | 1 | 2 | 2 | 1 | 2 |
| Grape Juice | 6 | 6 | 6 | 6 | 5 |
| Java Concentrate | 4 | 4 | 4 | 4 | 5 |
| Hot Coffee | 2 | 2 | 2 | 2 | 3 |
| Mustard | 3 | 2 | 2 | 3 | 3 |
| Lipstick | 3 | 2 | 3 | 3 | 4 |
| Green Crayon | 8 | 7 | 7 | 8 | 7 |
| Graphite | 7 | 6 | 6 | 6 | 6 |
| Leneta Oil | 7 | 7 | 7 | 7 | 7 |
| Total | 41 | 38 | 39 | 40 | 42 |

Examples 36-39

In Examples 36 and 37, Base Formulations were prepared using PUA1 and blended at 10% and 20% with the Base Acrylic latex. In Comparative Examples 38 and 39, the PUA1 of Examples 36 and 37 was replaced with a polyurethane resin (PUR, NeoRez R-2180, available from DSM Coating Resins, LLC, The Netherlands).

Greater stain resistance was observed for Base Formulations including 10% and 20% PUA1 resin blends than the Base Formulations including 10% and 20% PUR resin blends.

TABLE 9

Comparative urethane resin blends.

| | Ex. 36 | Ex. 37 | CE. 38 | CE. 39 |
|---|---|---|---|---|
| Stain | 10% PUA 1 | 20% PUA 1 | 10% PUR | 20% PUR |
| Wine | 3 | 5 | 3 | 4 |
| Grape Juice | 5 | 7 | 4 | 6 |
| Java Concentrate | 7 | 8 | 6 | 7 |
| Hot Coffee | 6 | 7 | 5 | 6 |
| Mustard | 2 | 3 | 2 | 0 |
| Lipstick | 5 | 8 | 3 | 5 |
| Green Crayon | 9 | 9 | 9 | 7 |
| Graphite | 10 | 10 | 7 | 7 |
| Leneta Oil | 9 | 9 | 7 | 5 |
| Total | 56 | 66 | 46 | 47 |

In view of the foregoing description and examples the present invention thus relates inter alia to the subject matter of the following clauses and claims though being not limited thereto.

Clause 1: A coating composition comprising an aqueous dispersion of a mixture of (i) urethane acrylate resin particles and (ii) acrylic resin particles, wherein the (i) urethane acrylate resin particles and (ii) acrylic resin particles are different from each other; and (iii) a matting agent.

Clause 2: The coating composition of clause 1, wherein the urethane acrylate resin comprises urea groups.

Clause 3: The coating composition of clause 1, wherein the coating composition comprises 5-50 wt. % urethane acrylate resin, based on total resin solids.

Clause 4: The coating composition of clause 3, wherein the coating composition comprises 10-35 wt. % urethane acrylate resin, based on total resin solids.

Clause 5: The coating composition of clause 1, wherein the matting agent comprises an inorganic matting agent.

Clause 6: The coating composition of clause 5, wherein the inorganic matting agent comprises silica, alumina silicate and/or calcium carbonate.

Clause 7: The coating composition of clause 1, wherein the matting agent comprises an organic matting agent.

Clause 8: The coating composition of clause 7, wherein the organic matting agent comprises a wax, thermoplastic polymer and/or a thermoset polymer, wherein the organic matting agent is different from the urethane acrylate resin particles (a) and the acrylic resin particles (b).

Clause 9: The coating composition of clause 1, wherein the matting agent is present in an amount of 5 to 50 wt. % based on total solids.

Clause 10: The coating composition of clause 1, wherein the coating composition is applied to a substrate and upon drying as a coating, has a 60° gloss level of no more than 20 units.

Clause 11: The coating composition of clause 10, wherein when the coating composition is applied to a substrate and, upon drying as a coating, has an 85° gloss level of no more than 35 units.

Clause 12: The coating composition of any of clauses 1-11, wherein the acrylic resin particles have a z-average particle size at least 10% greater than the urethane acrylate resin particles.

Clause 13: The coating composition of any of clauses 1-12, wherein when the coating composition is applied to a substrate and dried to form a coating, the coating exhibits an improved stain resistance compared to the same coating composition not including the urethane acrylate resin particles.

Clause 14: The coating composition of any of clauses 1-13, wherein the urethane acrylate resin particles have a z-average particle size at least 50% smaller than the acrylic resin particles.

Clause 15: The coating composition of any of clauses 1-14, wherein the composition has a VOC of less than 50 g/L.

Clause 16: The coating composition of any of clauses 1-15, wherein the urethane acrylate resin particles and the acrylic resin particles are incompatible with each other.

Clause 17: A method of imparting stain resistance to a substrate with low gloss, comprising applying to at least a portion of the substrate the coating composition of any of clauses 1-15.

Clause 18: The method of clause 17, further comprising drying the coating composition at ambient temperature to form a coating.

Clause 19: A substrate at least partially coated with the coating composition of any of clauses 1-16.

Clause 20: The substrate of clause 19, wherein the coated portion of the substrate is at least in part non-metallic.

Clause 21: The substrate of clause 19, wherein the coated portion of the substrate is non-metallic.

Clause 22: The substrate of any of clauses 19-21, wherein the substrate is an architectural component.

Whereas particular aspects of this invention have been described above for purposes of illustration, it will be evident to those skilled in the art that numerous variations of the details of the present invention may be made without departing from the invention as defined in the appended claims.

The invention claimed is:

1. A coating composition comprising a mixture of:
   an aqueous dispersion of a mixture of (i) urethane acrylate resin particles and (ii) acrylic resin particles, wherein the (i) urethane acrylate resin particles and (ii) acrylic resin particles are different from each other; and
   (iii) a matting agent,
   wherein the coating composition is dryable at ambient conditions,
   wherein the urethane acrylate resin particles are prepared from a reaction mixture comprising a free radical initiator and ethylenically unsaturated monomers that have undergone free radical polymerization of acrylate groups to form the urethane acrylate resin particles prior to inclusion in the coating composition,
   wherein the acrylic resin particles have a z-average particle size at least 10% greater than that of the urethane acrylate resin particles.

2. The coating composition of claim 1, wherein the urethane acrylate resin comprises urea groups.

3. The coating composition of claim 1, wherein the coating composition comprises 5-50 wt. % urethane acrylate resin, based on total resin solids.

4. The coating composition of claim 3, wherein the coating composition comprises 10-35 wt. % urethane acrylate resin, based on total resin solids.

5. The coating composition of claim 1, wherein the matting agent comprises an inorganic matting agent.

6. The coating composition of claim 5, wherein the inorganic matting agent comprises silica, alumina silicate and/or calcium carbonate.

7. The coating composition of claim 1, wherein the matting agent comprises an organic matting agent.

8. The coating composition of claim 7, wherein the organic matting agent comprises a wax, a thermoplastic polymer and/or a thermoset polymer, wherein the organic matting agent is different from the urethane acrylate resin particles (a) and the acrylic resin particles (b).

9. The coating composition of claim 1, wherein the matting agent is present in an amount of 5 to 50 wt. %, based on total solids.

10. The coating composition of claim 1, wherein when the coating composition is applied to a substrate and upon drying as a coating, has a 60° gloss level of no more than 20 units.

11. The coating composition of claim 10, wherein when the coating composition is applied to a substrate and upon drying as a coating, has an 85° gloss level of no more than 35 units.

12. The coating composition of claim 1, wherein when the coating composition is applied to a substrate and dried to form a coating, the coating exhibits an improved stain resistance compared to the same coating composition not including the urethane acrylate resin particles.

13. The coating composition of claim 1, wherein the urethane acrylate resin particles have a z-average particle size at least 50% smaller than the acrylic resin particles.

14. The coating composition of claim 1, wherein the coating composition has a VOC of less than 50 g/L.

15. A method of imparting stain resistance to a substrate with low gloss, comprising applying to at least a portion of the substrate the coating composition of claim 1.

16. The method of claim 15, further comprising drying the coating composition at ambient temperature to form a coating.

17. A method of imparting stain resistance to a substrate with low gloss, comprising applying to at least a portion of the substrate the coating composition of claim 10.

18. A substrate at least partially coated with the coating composition of claim 1 wherein the urethane acrylate resin particles are prepared from a reaction mixture comprising a free radical initiator and ethylenically unsaturated monomers that have undergone free radical polymerization of acrylate groups to form the urethane acrylate resin particles prior to inclusion in the coating composition,
   wherein the acrylic resin particles have a z-average particle size at least 10% greater than that of the urethane acrylate resin particles.

19. The substrate of claim 18, wherein the coated portion of the substrate is at least in part non-metallic.

20. The substrate of claim 18, wherein the coated portion of substrate is non-metallic.

21. The substrate of claim 18, wherein the substrate is an architectural component.

22. The coating composition of claim 1, wherein the coating composition is dryable to form a dry paint film without applying radiation.

23. A coating composition for application to an interior wall comprising a mixture of:
   an aqueous dispersion of a mixture of (i) urethane acrylate resin particles and (ii) acrylic resin particles, wherein the (i) urethane acrylate resin particles and (ii) acrylic resin particles are different from each other; and (iii) a matting agent,
wherein the coating composition is dryable at ambient conditions,
wherein the coating composition is dryable to form a dry paint film.

\* \* \* \* \*